United States Patent
Wang et al.

(10) Patent No.: US 12,004,038 B2
(45) Date of Patent: Jun. 4, 2024

(54) HANDOVER PROCEDURE FOR VEHICLE BASED COMMUNICATIONS

(71) Applicant: ZTE Corporation, Guangdong (CN)

(72) Inventors: Mengzhen Wang, Guangdong (CN); Lin Chen, Guangdong (CN); Ying Huang, Guangdong (CN)

(73) Assignee: ZTE Corporation, Shenzhen (CN)

(*) Notice: Subject to any disclaimer, the term of this patent is extended or adjusted under 35 U.S.C. 154(b) by 504 days.

(21) Appl. No.: 17/246,234

(22) Filed: Apr. 30, 2021

(65) Prior Publication Data

US 2021/0258853 A1 Aug. 19, 2021

Related U.S. Application Data

(63) Continuation of application No. PCT/CN2018/113376, filed on Nov. 1, 2018.

(51) Int. Cl.
*H04W 36/32* (2009.01)
*H04W 28/02* (2009.01)
*H04W 36/00* (2009.01)
*H04W 36/22* (2009.01)
*H04W 36/30* (2009.01)

(52) U.S. Cl.
CPC ....... *H04W 36/32* (2013.01); *H04W 28/0268* (2013.01); *H04W 36/0009* (2018.08); *H04W 36/22* (2013.01); *H04W 36/30* (2013.01)

(58) Field of Classification Search
CPC ......... H04W 28/0268; H04W 36/0009; H04W 36/32; H04W 36/30; H04W 36/22; H04W 36/03
See application file for complete search history.

(56) References Cited

U.S. PATENT DOCUMENTS

| 11,622,300 B2* | 4/2023 | Byun ................... H04W 36/02 370/331 |
| 2015/0181481 A1 | 6/2015 | Masini et al. |
| 2017/0289864 A1 | 10/2017 | Narasimha et al. |

(Continued)

FOREIGN PATENT DOCUMENTS

| CN | 101754293 A | 6/2010 |
| CN | 106879034 A | 6/2017 |

(Continued)

OTHER PUBLICATIONS

CNIPA, Notification to Complete Formalities of Registration for Chinese Application No. 201880099295.9, dated Jan. 16, 2023, 4 pages.

(Continued)

*Primary Examiner* — Brian D Nguyen
(74) *Attorney, Agent, or Firm* — Perkins Coie LLP

(57) ABSTRACT

A method of wireless communication includes transmitting, from a source communication node, a first message to a target communication node requesting a hand-over procedure for handing over one or more mobile devices from the source communication node to the target communication node. The first message indicates a traffic pattern or group information of the one or more mobile devices. The method also includes receiving, by the source communication node, a second message from the target communication node in response to the first message.

20 Claims, 10 Drawing Sheets

(56) References Cited

U.S. PATENT DOCUMENTS

| | | | |
|---|---|---|---|
| 2018/0160342 A1 | 6/2018 | Park et al. | |
| 2020/0305038 A1* | 9/2020 | Tooher | H04W 74/0833 |
| 2020/0344030 A1* | 10/2020 | Cheng | H04W 74/0833 |
| 2021/0105648 A1* | 4/2021 | Kim | H04W 56/001 |
| 2021/0314828 A1* | 10/2021 | Kim | H04W 36/0058 |
| 2021/0385710 A1* | 12/2021 | Jin | H04W 36/0072 |
| 2022/0312288 A1* | 9/2022 | Tsuboi | H04W 36/16 |

FOREIGN PATENT DOCUMENTS

| | | |
|---|---|---|
| CN | 107396366 A | 11/2017 |
| CN | 108024294 A | 5/2018 |
| WO | 2012/134116 A1 | 10/2012 |
| WO | 2012/134116 A2 | 10/2012 |
| WO | 2012/162353 A1 | 11/2012 |
| WO | 2012/162393 A1 | 11/2012 |
| WO | 2013/066071 A1 | 5/2013 |
| WO | 2014110951 A1 | 7/2014 |
| WO | 2017/119919 A1 | 7/2017 |
| WO | 2018/128076 A1 | 7/2018 |

OTHER PUBLICATIONS

Extended European Search Report dated May 20, 2022 for European Patent Application No. 18930061.9 (13 pages).
Huawei et al: "Group mobility procedures", 3GPP TSG-RAN WG2 #97bis, Spokane, Washington, USA, R2-1703469, 4 pages, Apr. 3-7, 2017.
EPO, Extended European Search Report for European Application No. 18930061.9, dated May 12, 2023, 13 pages.
Extended European Search Report dated Oct. 28, 2022 for European Patent Application No. 18930061.9 (13 pages).
International Search Report and Written Opinion in International Application No. PCT/CN2018/113376, dated Jul. 25, 2019, 7 pages.
Chinese Office Action dated Mar. 2, 2022 for Chinese Patent Application No. 2018800992959 (18 pages).
Qualcomm Inc., "QoS and priority handling for PC5 based V2X communication", SA WG2 Meeting #115, Nanjing, P.R. China, 3GPP, S2-162859, 3 pages, May 23-27, 2016.

\* cited by examiner

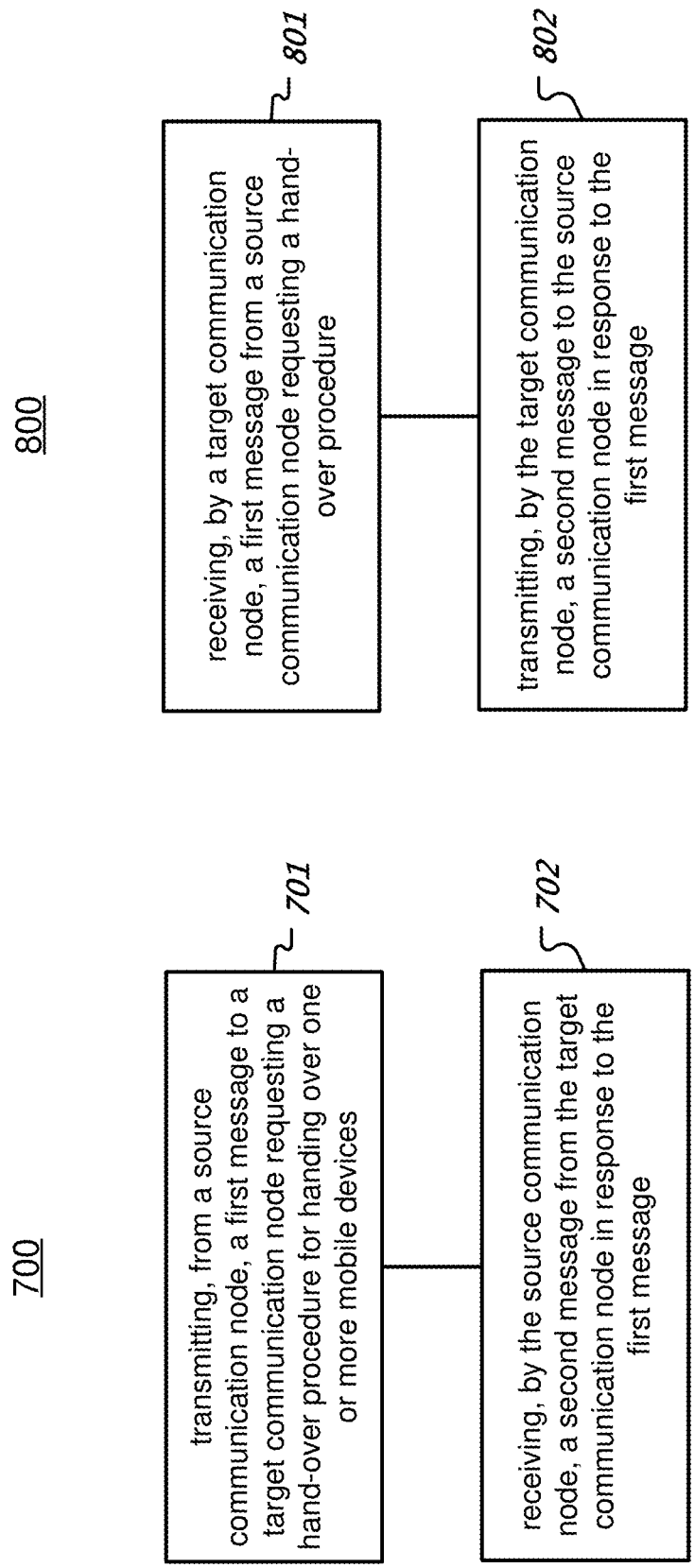

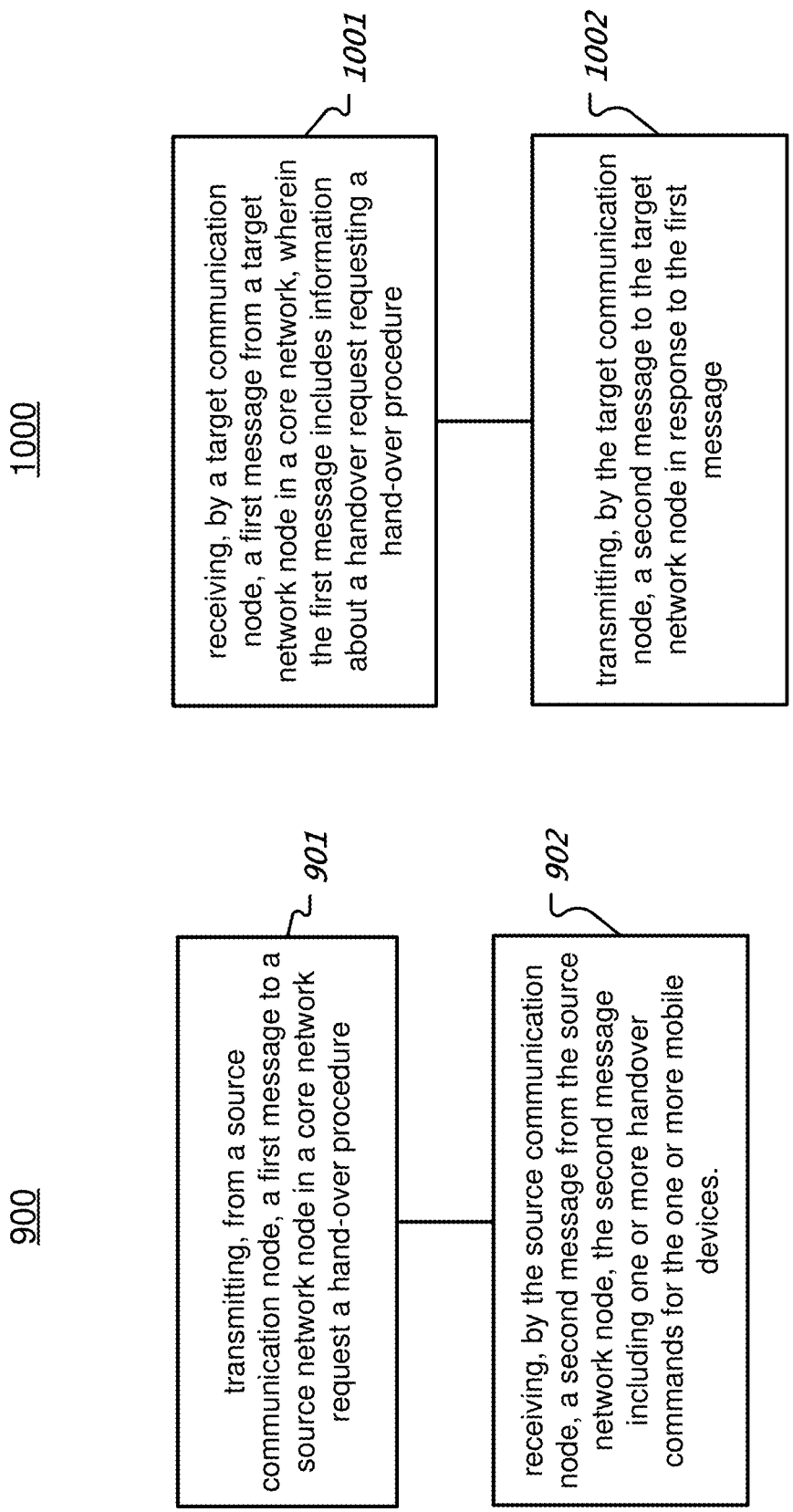

HANDOVER PROCEDURE FOR VEHICLE BASED COMMUNICATIONS

CROSS-REFERENCE TO RELATED APPLICATIONS

This application is a continuation of International Patent Application No. PCT/CN2018/113376, filed on Nov. 1, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for managing communication and mobility for a vehicle or a vehicle group in handover scenarios.

In one example aspect, a wireless communication method is disclosed. The method includes transmitting, from a source communication node, a first message to a target communication node requesting a hand-over procedure for handing over one or more mobile devices from the source communication node to the target communication node. The first message indicates a traffic pattern or a group information of the one or more mobile devices. The method also includes receiving, by the source communication node, a second message from the target communication node in response to the first message.

In another example aspect, a wireless communication method is disclosed. The method includes receiving, by a target communication node, a first message from a source communication node requesting a hand-over procedure for handing over one or more mobile devices from the source communication node to the target communication node. The first message indicates a traffic pattern or a group information of the one or more mobile device. The method also includes transmitting, by the target communication node, a second message to the source communication node in response to the first message.

In another example aspect, a wireless communication method is disclosed. The method includes transmitting, from a source communication node, a first message to a source network node in a core network. The first message requests a hand-over procedure for handing over one or more mobile devices from the source communication node to a target communication node. The first message includes a traffic pattern or a group information of the one or more mobile device. The method also includes receiving, by the source communication node, a second message from the source network node. The second message includes one or more handover commands for the one or more mobile devices.

In another example aspect, a wireless communication method is disclosed. The method includes receiving, by a target communication node, a first message from a target network node in a core network. The first message includes information about a handover request requesting a hand-over procedure for handing over one or more mobile devices from a source communication node to the target communication node. The handover request includes a traffic pattern or a group information of the one or more mobile devices. The method also includes transmitting, by the target communication node, a second message to the target network node in response to the first message. The second message includes one or more handover commands for the one or more mobile devices.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 7 is a flowchart representation of a method for wireless communication in accordance with one or more embodiments of the present technology.

FIG. 8 is a flowchart representation of another method for wireless communication in accordance with one or more embodiments of the present technology.

FIG. 9 is a flowchart representation of another method for wireless communication in accordance with one or more embodiments of the present technology.

FIG. 10 is a flowchart representation of yet another method for wireless communication in accordance with one or more embodiments of the present technology.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

A vehicle network refers to a network that performs wireless communication and information exchange between a vehicle and an object (a car, a pedestrian, a roadside equipment, and the Internet, etc.) according to a communication protocol and data interaction standards. Communication through the Internet of Vehicles enables vehicles to gain driving safety, improve traffic efficiency, and access convenience or entertainment information. The Internet of Vehicles communication includes three different types: Vehicle-to-Vehicle (V2V), communication between vehicles and roadside equipment/network infrastructure (Vehicle-To-Infrastructure/Vehicle-to-Network (V2I/V2N for short)), and Vehicle-to-Pedestrian (V2P). These types are collectively referred to as V2X communication.

Figure 1:
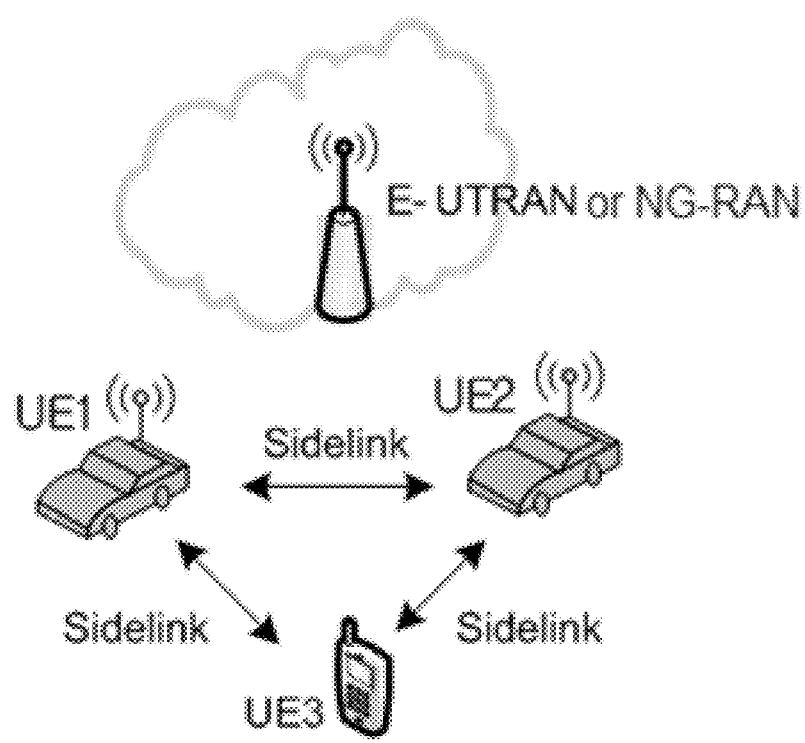
FIG. 1 shows an example of a sidelink communication between user devices.

In the Long Term Evolution (LTE) communication systems, V2X communication is performed based on the direct link between the User Equipment (UE). That is, the service data is not forwarded by the base station and the core network. Instead, data is directly transmitted by the source UE to the target UE through the air interface. FIG. 1 shows an example of a sidelink communication between user devices. The communication mechanism shown in FIG. 1 is referred to as PC5-based V2X communication or V2X sidelink communication.

With the advancement of technology and the development of the automation industry, the V2X communication scenario is further extended and has higher performance requirements. Advanced V2X services are divided into four main categories: vehicle platooning, extended sensors, automated driving (semi-automated or full-automated driving), and remote driving. Examples of performance requirements include: packet size ranges from 50 to 12000 bytes, transmission rate ranges from 2 to 50 messages per second, maximum end-to-end delay ranges from 3 to 500 milliseconds, reliability ranges from 90% to 99.999%, data rate ranges from 0.5 to 1000 Mbps, and the transmission range is between 50 to 1000 meters. In particular, vehicle group communication is an important scenario of advanced vehicle networking services. It is an important aspect to ensure the service continuity of high-speed mobile vehicle group communication.

However, currently there is no efficient mechanism to manage vehicle group communication and mobility, particularly in handover scenarios. The present document discloses various techniques that can be used by implementations in handover scenarios to efficiently hand over a group of vehicles without incurring much signaling cost. The present document also discloses techniques that can be used by embodiments for handing over a vehicle that is not in a vehicle group.

FIG. 7 is a flowchart representation of a method 700 for wireless communication in accordance with one or more embodiments of the present technology. The method 700 includes, at step 701, transmitting, from a source communication node, a first message to a target communication node requesting a hand-over procedure for handing over one or more mobile devices from the source communication node to the target communication node. The first message indicates a traffic pattern or a group information of the one or more mobile device. The method 700 includes, at step 702, receiving, by the source communication node, a second message from the target communication node in response to the first message.

In some embodiments, the traffic pattern includes at least one of the following: a set of traffic interval or periodicity, a timing offset, a 5G Quality of Service Indicator (5QI), reliability, priority, delay, ProSe-Per-Packet Priority (PPPP), ProSe-Per-Packet Reliability (PPPR), destination Layer-2 ID, maximum transport block (TB) size, uplink (UL) logical channel identity, sidelink logical channel identity, expected configured grant type (e.g., type 1 or type 2), a time duration, a delay, or a subcarrier spacing.

In some embodiments, the group information includes at least one of the following: a group handover indication, a group identifier, a service type, an available RAT information, a group member number, a group header identifier, a group header, and a member UE identifier (layer 2 identifier or Cell-Radio Network Temporary Identifier (C-RNTI)), queue movement information (position, direction, speed, acceleration, planned driving route), platoon/group sidelink communication Quality of Service (QoS) requirement, Uu service related information of each UE in the group, sidelink communication related information of each UE.

In some embodiments, the second message includes a group handover response. The group handover response includes at least one of the following: whether to accept the request of sidelink resource for the group, the accepted group member list, the group communication sidelink Bandwidth Part (BWP) or beam direction, and the target side mode 2 (e.g., UE performing autonomously resource selection) transmission/reception resource allocated for each member, the resource pool/abnormal resource pool, the common mode 2 resource pool, the Xn/N2 interface identifier assigned to the UE1 and other group members on the target side, the accepted or denied PDU session list, or the accepted/denied sidelink radio bearer (SLRB)/QoS flow list. In some embodiments, a separate handover command message is generated for each member in the group.

In some embodiments, before the sending the group handover request information, the method further includes acquiring information related to the car networking group communication from the UE, a group manager/leader, a core network element (e.g., Access and Mobility Function (AMF)), or a V2X server.

FIG. 8 is a flowchart representation of a method 800 for wireless communication in accordance with one or more embodiments of the present technology. The method 800 includes, at step 801, receiving, by a target communication node, a first message from a source communication node requesting a hand-over procedure for handing over one or more mobile devices from the source communication node to the target communication node. The first message indicates a traffic pattern or group information of the one or more mobile device. The method 800 includes, at step 802, transmitting, by the target communication node, a second message to the source communication node in response to the first message.

FIG. 9 is a flowchart representation of a method 900 for wireless communication in accordance with one or more embodiments of the present technology. The method 900 includes, at step 901, transmitting, from a source communication node, a first message to a source network node in a core network. The first message requests a hand-over procedure for handing over one or more mobile devices from the source communication node to a target communication node. The first message includes a traffic pattern or group information of the one or more mobile device. The method 900 also includes, at step 902, receiving, by the source communication node, a second message from the source network node, the second message including one or more handover commands for the one or more mobile devices.

FIG. 10 is a flowchart representation of a method 1000 for wireless communication in accordance with one or more embodiments of the present technology. The method 1000 includes, at step 1001, receiving, by a target communication node, a first message from a target network node in a core network, wherein the first message includes information about a handover request requesting a hand-over procedure for handing over one or more mobile devices from a source communication node to the target communication node. The handover request includes a traffic pattern or group information of the one or more mobile devices. The method 1000 also includes, at step 1002, transmitting, by the target communication node, a second message to the target network node in response to the first message, the second message including one or more handover commands for the one or more mobile devices.

Some examples of the disclosed techniques are described in the following example embodiments.

Embodiment 1

This embodiment provides an example process for a vehicle group to perform a group handover from a source base station to a target base station. Techniques described for this embodiment can be applied to scenarios in which (1) the UE's AMF does not change, but the User Plane Function (UPF) might change, (2) there is an Xn interface between the source and target base stations, and (3) both the AMF and the source base station/target base station have an N2 interface.

Figure 2:
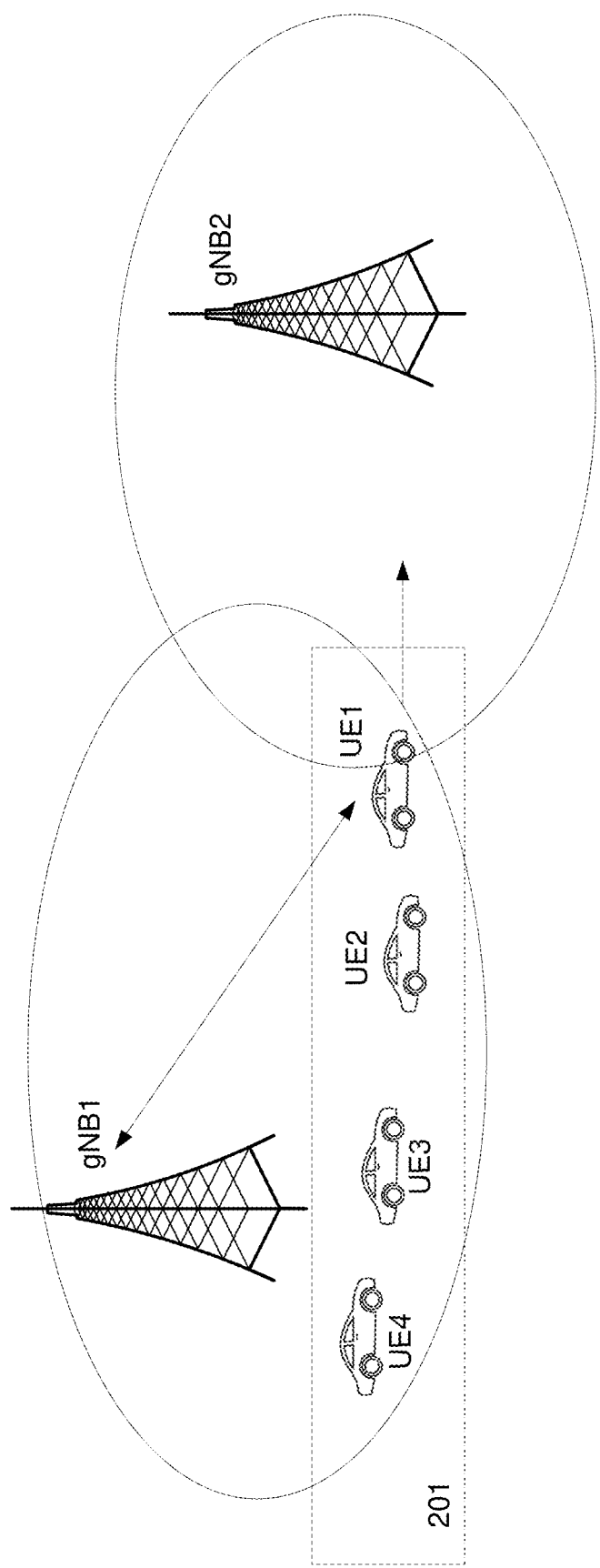
FIG. 2 shows an example of a vehicle group moving towards a target base station from a source base station.

FIG. 2 shows an example of a vehicle group moving towards a target base station from a source base station. Vehicle group A 201, which includes UE1 (the leader/manager of the group), UE2, UE3, and UE4, moves from the source base station gNB1 to the target base station gNB2. The vehicle group 201 can also be referred to as a vehicle platoon or vehicle platooning. The group members communicate with each other through the PC5 interface. The manager UE1 can obtain information from the network or a Road Side Unit (RSU) and then forward the information to other members via the PC5 interface. The manager can also collect information transmitted by other members and send the information to the network or the RSU. In some embodiments, each UE in the Vehicle Group A performs communication with the gNB1 independently.

Figure 3A:
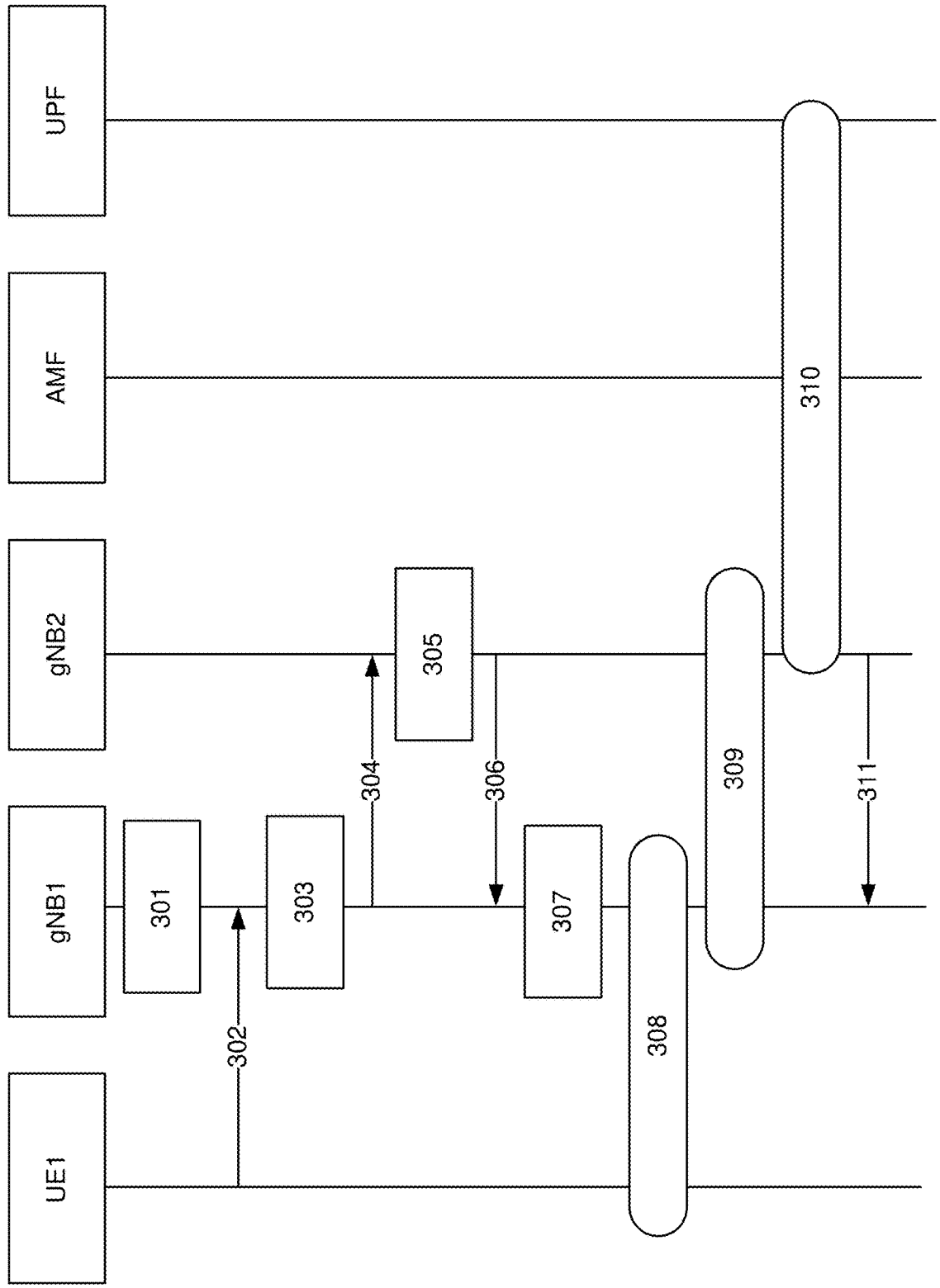
FIG. 3A shows an example of a hand-over procedure for a vehicle group in accordance with one or more embodiments of the present technology.

FIG. 3A shows an example of a hand-over procedure for a vehicle group in accordance with one or more embodiments of the present technology. The source base station gNB1 stores, at step 301, the context information of UE 1. The context information includes group information about the vehicle group A. The gNB1 can obtain group information about the vehicle group A from the UE1, the core network, or the V2X server. Examples of the group information include the platoon/group identifier, the platoon/group service type, the radio access technology (RAT) of the platoon/group sidelink communication, the number of members in the platoon/group, and information about the individual member UEs (such as Layer 2 identification or C-RNTI), movement pattern information about the platoon/group (such as location, direction, speed, acceleration, planned driving route, etc.), the QoS requirements for platoon/group sidelink communication (such as 5QI, reliability, priority, delay, PPPP, PPPR, a Pack Delay Budget (PDB), a Packet Error Rate (PER), preemption options, PC5 interface UE maximum aggregate bit rate, group communication guarantee bit rate, etc.), and so on.

The gNB1 obtains, at step 302, measurement reports from the UE1. In some embodiments, the gNB1 can also obtain measurement reports from other members of platoon/group A (such as UE2/UE3/UE4), the capabilities of performing group handover of other members of the group, and willingness of the other members to perform group handover. The gNB1 can decide to perform a group handover when the group member UEs can detect the target gNB2 cell or one or more handover conditions are satisfied.

When the head UE1 moves to the cell edge, the gNB1 decides, at step 303, to hand over the UE1 and the vehicle group it belongs to based on the group information, measurement information provided by the UE1, measurement reports/capabilities/willingness of performing group handover of group member UEs and relevant Uu and/or sidelink radio resource condition.

The gNB1 sends, at step 304, a group handover (HO) request to the target gNB2. The group HO request can include at least one of the following information: group handover indication (or add group HO reason in the Cause element), a group/platoon identifier, the number of members in the group/platoon, an identifier for each individual member (e.g., Layer 2 identifier or C-RNTI), a group movement pattern (location, direction, speed, acceleration, planned driving route, etc.), the QoS requirements for the group/platoon sidelink communication, the group/platoon service type, the RATs supported by the group/platoon sidelink communication. The group HO request further includes information about the UE and other group members, such as the Next Generation-Radio Access Network (NG-RAN) node UE Xn Access Point (AP) ID, UE context information, and/or HO preparation information. The UE context information indicates the Uu interface/port services to be switched/PDU session related information to be established on the target side (e.g., a PDU session identifier, network slice identifier, PDU session Aggregate Maximum Bit Rate (AMBR), QoS Flow Identity (QFI), QoS flow level QoS parameters, source Data Radio Bearer (DRB) to QoS flow mapping), and/or PC5 Interface sidelink radio bearer (SLRB) related information (e.g., unicast/multicast/broadcast indication, sidelink bearer identifier, UE-PC5-Aggregated Maximum Bit Rate (UE-PC5-AMBR), Allocation and Retention Priority (ARP), PC5 QoS flow (QFI), QoS flow level QoS parameters (e.g., 5QI, reliability, priority, delay, PPPP, PPPR, PDB, PER, resource type, Guaranteed Flow Bit Rate (GFBR), Maximum Flow Bit Rate (MFBR), preemption configurations, the mapping relationship between SLRB and QFI/5QI, etc.). The HO preparation information includes information transmitted from the source base station to the target base station for handover preparation, such as the UE capability, etc. Using a single HO message (e.g., group HO request) to initiate the handover procedure for the entire vehicle group reduces the signaling cost. Alternatively, the Xn handover messages of other members of group/platoon can be transmitted separately. For example, other group member handover decisions can be made slightly in advance as compared to the legacy one by one handover procedure, and the target gNB can perform admission control for all the UEs in the group as a whole.

The gNB2 performs, at step 305, admission control based on Uu and sidelink resources. The gNB2 then transmits, at step 306, an HO response to the gNB1. The HO response indicates at least one of the following: whether the request of sidelink resources for the group/platoon can be accepted, the list of accepted group members, the platoon/group communication sidelink Bandwidth Part (BWP) and/or the beam direction, the mode-2 transmission/reception/exception resources or resource pool, the common Mode 2 resource pool shared by all the group UEs, the NG-RAN node UE XnAP ID assigned to UE1 and other group/platoon members by the gNB2, a list of allowed or denied PDU session for each UE (including admitted/denied QoS flow list, e.g. QFIs), a list of allowed or denied SLRB/QoS flow/QFI list for each UE including the denied cause, the mapping of SLRB and QoS flows, separate handover command messages for individual UEs (e.g., an RRC container that includes the C-RNTI of each UE assigned by the gNB2, bearer configuration of the Uu interface for each UE, and the bearer configuration of the PC5 interface). The HO response can be transmitted to the gNB1 in a single message via the Xn interface (e.g., group HO request ACK).

According to the HO response message, the gNB1 configures/forwards, at step 307, a handover command for the accepted group members. To avoid premature handovers, the gNB1 can configure the handover command for different group members of the UE at different times, and the subsequent user plane data handover is performed by each UE. After receiving the handover command, the member UE performs, at 308, the handover procedure to gain access to the target gNB2, and then acquires the sidelink communication resources from the gNB2. The gNB1 forwards, at step 309, the buffered UE Uu interface service to the gNB2, and the UE air interface handover is completed. The target gNB2 notifies, at step 310, the AMF to perform the path switch. The gNB2 then sends, at step 311, the UE context release message to the gNB1, and the gNB1 releases the UE context.

Embodiment 2

This embodiment provides another example group handover procedure from a source base station to a target base station. Techniques described for this embodiment can be applied to scenarios in which an N2 handover procedure is required. In such cases, the AMF and UPF can change.

Figure 3B:
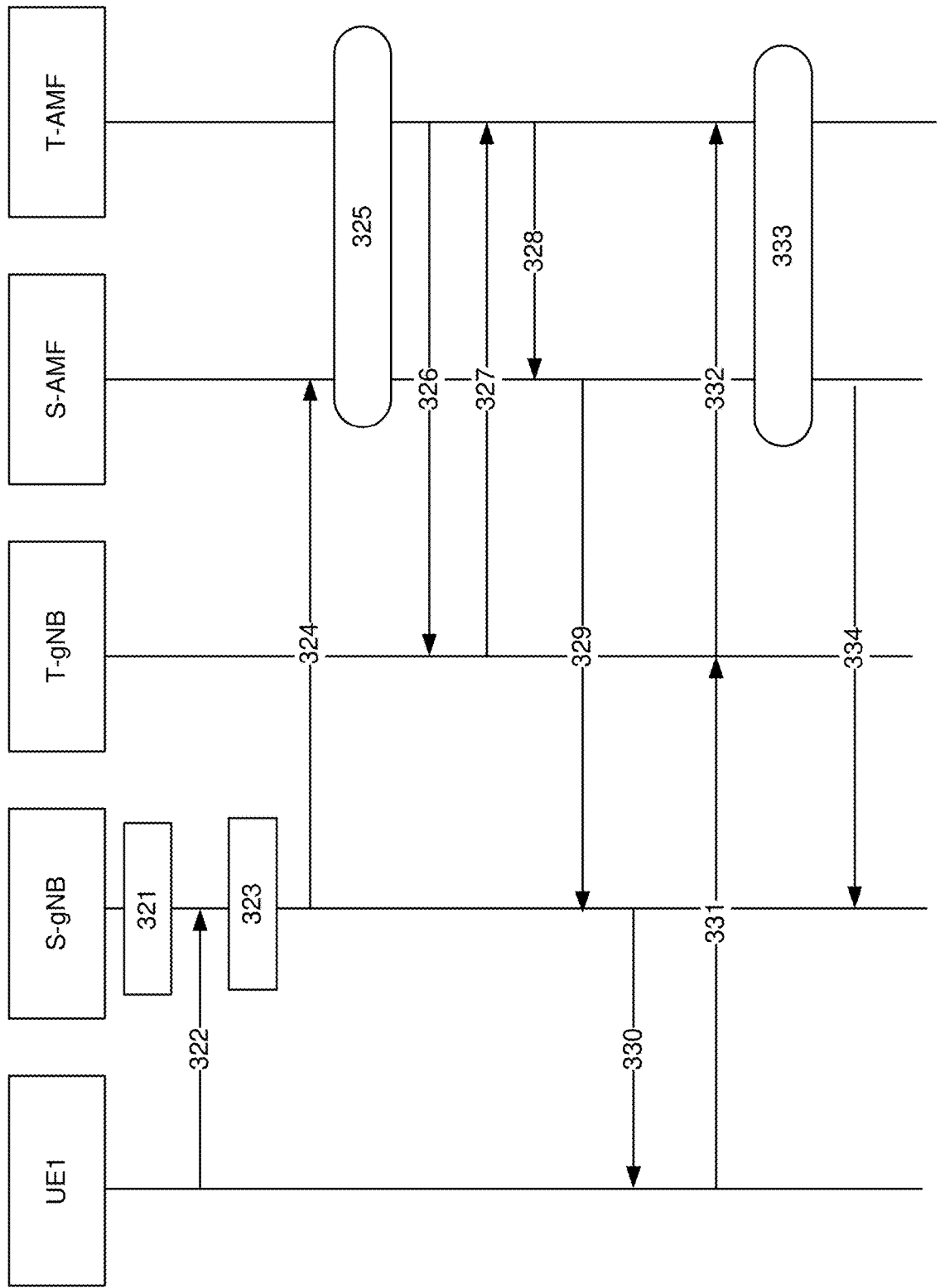
FIG. 3B shows another example of a hand-over procedure for a vehicle group in accordance with one or more embodiments of the present technology.

FIG. 3B shows an example of another hand-over procedure for a vehicle group in accordance with one or more embodiments of the present technology. The source base station S-gNB stores, at step 321, the context information of UE1. The context information includes group information about the vehicle group A. The S-gNB can obtain group information about the vehicle group A from the UE1, the core network, or the V2X server. Examples of the group information include the platoon/group identifier, the platoon/group service type, the RAT of the platoon/group sidelink communication, the number of members in the platoon/group, and information about the individual member UEs (such as Layer 2 identification or C-RNTI), movement pattern information about the platoon/group (such as location, direction, speed, acceleration, planned driving route, etc.), the QoS requirements for platoon/group sidelink communication (such as 5G 5QI, reliability, priority, delay, PPPP, PPPR, PDB, PER, preemption options, PC5 interface UE maximum aggregate bit rate, group communication guarantee bit rate, etc.).

The S-gNB obtains, at step 322, measurement reports from the UE1. In some embodiments, the S-gNB can also obtain measurement reports from other members of platoon/group A (such as UE2/UE3/UE4), the capabilities of performing group handover of other members of the group, and willingness of the other members to perform group handover. The gNB1 can decide to perform a group handover when the group member UEs can detect the target gNB2 cell or one or more handover conditions are satisfied.

When the head UE1 moves to the cell edge, the S-gNB decides, at step 323, to hand over the UE1 and the vehicle group it belongs to based on the group information, measurement information provided by the UE1, measurement reports/capabilities/willingness of performing group handover of group member UEs and relevant Uu and/or PC5 radio resource condition. In case the Xn interface is not available between the source gNB and the target gNB, a N2 handover procedure is initiated by the source gNB.

The S-gNB sends, at step 324, a group handover request to the source AMF (S-AMF). The group HO request can include at least one of the following information: group handover indication, a group/platoon identifier, the number of members in the group/platoon, the Uu interface services information of each UE in the group (e.g., information about the PDU sessions/QoS flows), a group movement pattern (location, direction, speed, acceleration, planned driving route, etc.), the QoS requirements for the group/platoon sidelink communication, the group/platoon service type, the RATs supported by the group/platoon sidelink communication, PC5 Interface sidelink radio bearer (SLRB) related information (e.g., unicast/multicast/broadcast indication, sidelink bearer identifier, UE-PC5-Aggregated Maximum Bit Rate (AMBR), Allocation and Retention Priority (ARP), PC5 QoS flow (QFI), QoS flow level QoS parameters (e.g., 5QI, reliability, priority, delay, PPPP, PPPR, PDB, PER, resource type, GFBR, MFBR), preemption configurations, the mapping relationship between SLRB and QFI/5QI, etc.).

The S-AMF selects, at step 325, a target AMF (T-AMF). The S-AMF also initiates a HO resource allocation procedure (e.g., transmitting Namf_Communication_CreateUEContext Request and/or UE context information) with the T-AMF. A session is then established between the T-AMF (or the target UPF) and the Session Management Function (SMF). The SMF checks whether the PDU sessions of the group members as indicated in the group HO request are accepted. The SMF sends a list of accepted/denied PDU sessions (e.g., with the N3 UP address and the UL CN Tunnel ID of the UPF or the reason for denial) to the T-AMF.

The T-AMF transmits, at step 326, a HO request (or a group HO request) to the T-gNB. The HO request (or the group HO request) can include the 5G-GUTI of member UE, N2 session information and security information, and the list of accepted/denied PDU sessions for each group member. The HO request (or the group HO request) can also include information about the HO request received by the S-AMF.

The T-gNB transmits, at step 327, an acknowledgement in response to the group HO request (e.g., HO request ACK). The acknowledgement can include N2 session response and/or a separate HO command for each UE, whether the request of sidelink resources for the group/platoon can be accepted, the list of accepted group members, the platoon/group communication sidelink BWP and/or the beam direction, the mode-2 transmission, reception, and exception resources or resource pool, the common Mode 2 resource pool shared by all the group UEs, a list of allowed or denied PDU session for each UE (including admitted/not admitted QoS flow list, e.g. QFIs), a list of allowed or denied SLRB/QoS flow/QFI list for each UE including the denied cause, the mapping of SLRB and QoS flows, the C-RNTI of each UE assigned by the gNB2, bearer configuration of the Uu interface for each UE, and the bearer configuration of the PC5 interface. For example, the acknowledgement can include a Target-to-Source transparent container for each UE (e.g., an HO command message generated by T-gNB and relayed via T-AMF, S-AMF and S-gNB to UE). A session update is performed between T-AMF (or T-UPF) and SMF. A session update is also performed between S-UPF and SMF.

T-AMF transmits, at step 328, a response (e.g., Namf_Communication_CreateUEContext Response) to the S-AMF. The response includes necessary N2 information for S-AMF to send HO command(s) to the S-RAN, including the Target-to-Source transparent container, the list of failed PDU sessions to be setup, N2 SM information (N3 DL Forwarding Information).

The S-AMF transmits, at step 329, a group HO acknowledgement to the S-gNB. The group HO acknowledgement can include a separate handover command for each of the UE and information such as whether the request of sidelink resources for the group/platoon can be accepted, the list of accepted group members, the platoon/group communication sidelink Bandwidth Part (BWP) and/or the beam direction, the mode-2 transmission/reception/exception resources or resource pool, the common Mode 2 resource pool shared by all the group UEs, a list of allowed or denied PDU session for each UE (including admitted/not admitted QoS flow list, e.g. QFIs), a list of allowed or denied SLRB/QoS flow/QFI list for each UE including the denied cause, the mapping of SLRB and QoS flows, the C-RNTI of each UE assigned by the gNB2, bearer configuration of the Uu interface for each UE, and the bearer configuration of the PC5 interface. For example, the group HO acknowledgement includes a Target-to-Source transparent container for each of the UE.

The S-gNB configures/forwards, at step 320, a handover command for the accepted group members based on the received group HO command. To avoid premature handovers, the gNB1 can configure the handover command for different group members of the UE at different times, and the subsequent user plane data handover is performed by each UE. After receiving the handover command, the member UE performs the handover procedure to gain access to the target gNB2, and then acquires the sidelink communication resources from the gNB2. The gNB1 forwards, at step 321, the buffered UE Uu interface service to the gNB2, and the UE air interface handover is completed. The target gNB2 notifies, at step 322, the T-AMF to perform the path switch. The S-AMF then sends, at step 334, the UE context release message to the gNB1, and the gNB1 releases the UE context.

Embodiment 3

This embodiment provides an example process for exchanging Uu and/or PC5 traffic pattern of the UE during handover from a source base station to a target base station. Techniques described for this embodiment can be applied to scenarios in which an Xn handover procedure can be used.

Figure 4A:
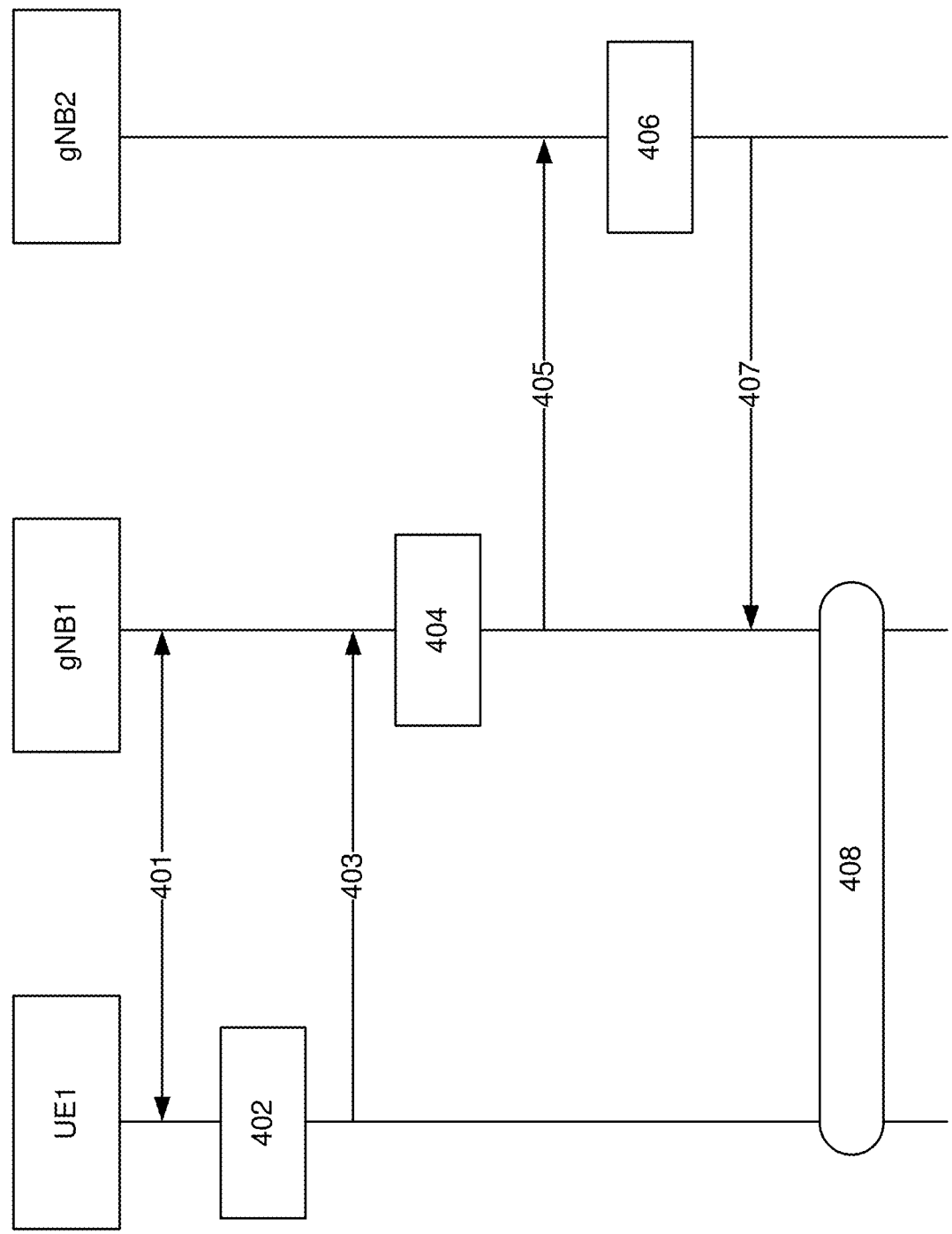
FIG. 4A shows an example of a hand-over procedure in accordance with one or more embodiments of the present technology.

FIG. 4A shows an example of the hand-over procedure in accordance with one or more embodiments of the present technology. In this embodiment, UE1 does not belong to a vehicle group, but may be moving in proximity to other vehicles. The UE1 maintains, at step 401, communication with the base station over the Uu interface while performing, at step 402, sidelink communication with other UEs on the PC5 interface. The traffic pattern of UE1 and other related configurations, such as configured grant type 1/type 2 (including the Uu interface and the sidelink communication), are communicated in the handover process.

When UE1 moves to the cell edge, UE1 transmits, at step 403, measurement reports to the source base station gNB1. The gNB1 decides, at step 404, to hand over UE1 to the target base station gNB2 based on the measurement report from UE1 and the radio resource conditions. The gNB1 sends, at step 405, the traffic pattern information and/or resource configuration information of the UE1 over the Uu interface and the PC5 interface to the target base station gNB2 in an HO request. In some embodiments, the traffic pattern includes at least one of: a set of traffic interval or periodicity, a timing offset, 5QI, priority or PPPP, reliability or PPPR, destination Layer-2 ID, maximum transport block (TB) size, uplink (UL) logical channel identity, sidelink logical channel identity, expected configured grant type (e.g., type 1 or type 2), time duration, a delay, or subcarrier spacing. In some embodiments, the resource configuration information includes at least one of the following: the configured grant type, the configured grant index, or periodicity.

In some embodiments, the gNB1 also sends information about sidelink communication to the gNB2. The information includes at least one of the following: a sidelink communication type (e.g., unicast, groupcast, or broadcast), a sidelink bearer identity, a sidelink logical channel identity, UE-PC5-AMBR, ARP, PC5 QoS flow or a list of PC5 QoS flows, a mapping between a sidelink bearer and a QFI, the GFBR or MFBR of each sidelink QoS flow.

The target base station gNB2 receives, in the HO request, the traffic pattern information about the communication over the Uu interface and the PC5 interface. The gNB2 may also receive the Uu and sidelink communication resources configured by the gNB1 for the UE1. The gNB2 then determines, at step 406, whether to accept the UE1 and whether configures the appropriate resources for the Uu interface and the PC5 interface service. If the gNB2 accepts the handover of the UE1, the gNB2 transmits, at step 407, a message to the UE1 to configure the Uu communication resource and the sidelink communication resource. The Uu/sidelink communication resource configuration information includes at least one of the following: a configured grant type (type 1 and/or type 2), a configured grant index, a periodicity, a subcarrier spacing, a time domain and/or frequency domain resource location, or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

Furthermore, the gNB2 may configure the Uu and/or PC5 bearer configuration for UE1. The gNB2 can include the above resource configuration information and bearer configuration in the handover command. For example, in some embodiments, the gNB2 includes information for a resource pool for autonomous resource selection, a resource pool for sidelink reception, or an exceptional resource pool for sidelink transmission. The gNB2 can also indicate a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; or a mapping between a scheduling request identity and a 5G QoS Identifier, a QoS Flow Identifier, a priority, a reliability, a delay, or a communication range level. In some embodiments, the resource configuration information is transmitted via an RRC container in the handover request response message sent to gNB1.

After receiving the handover request response message of the gNB2, the gNB1 sends, at step 408, the handover command from the gNB2 to the UE1 through an RRC reconfiguration message. After receiving the handover command, the UE1 completes the handover.

In some embodiments, with configured grant type 1, the RRC container directly provides the configured uplink grant (including the periodicity) to UE. In some embodiments, with configured grant type 2, the RRC container defines the periodicity of the configured uplink assignments while PDCCH addressed to CS-RNTI can either signal and activate the configured uplink assignment or deactivate it.

Embodiment 4

This embodiment provides another example for exchanging Uu and/or PC5 traffic pattern of the UE during the handover from a source base station to a target base station. Techniques described for this embodiment can be applied to scenarios in which an N2 handover procedure is required.

Figure 4B:
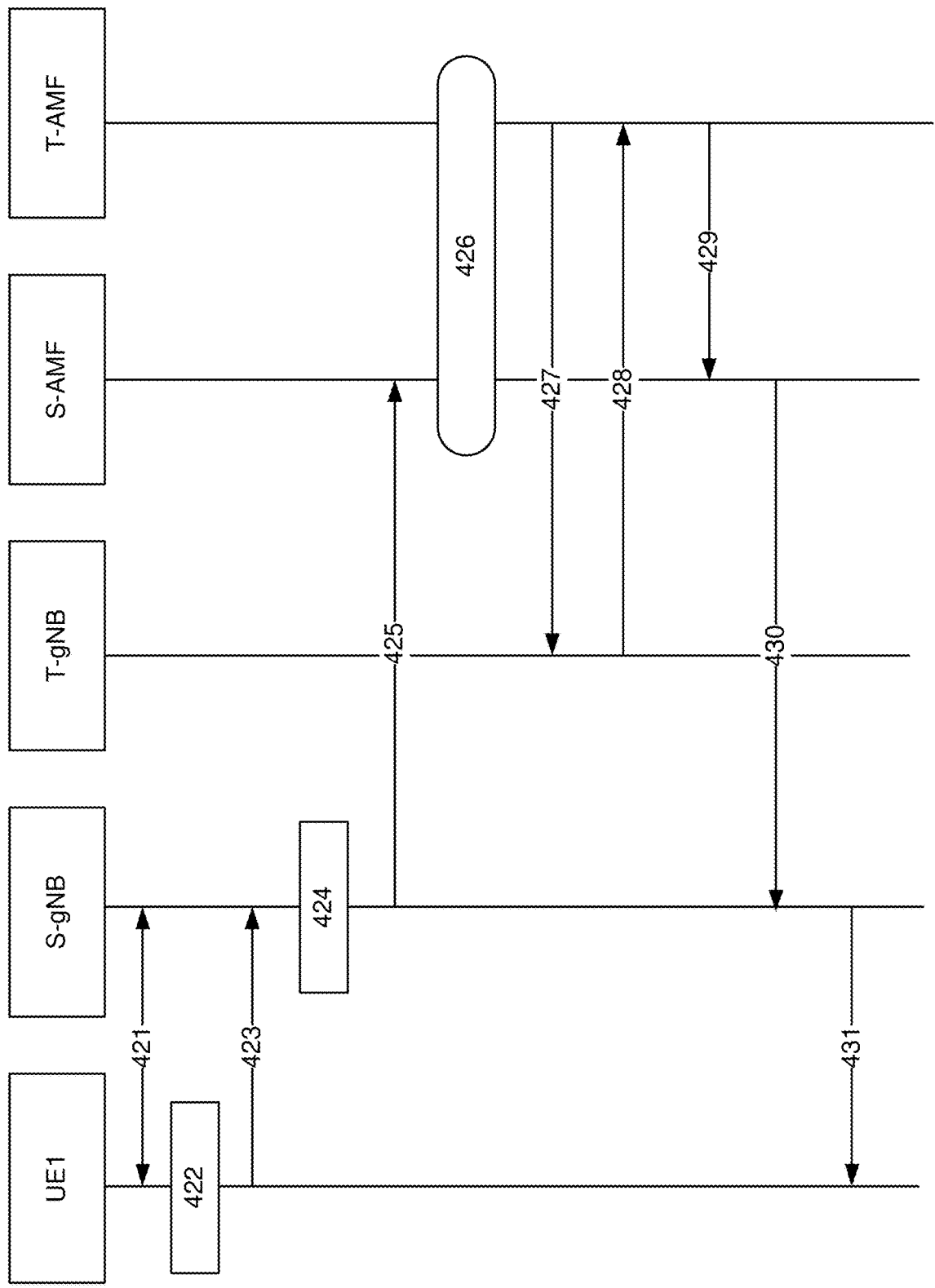
FIG. 4B shows another example of a hand-over procedure in accordance with one or more embodiments of the present technology.

FIG. 4B shows another example of a hand-over procedure in accordance with one or more embodiments of the present technology. In this embodiment, UE1 does not belong to a vehicle group, but may move in proximity with other vehicles. The UE1 maintains, at step 421, communication with the source base station (S-gNB) over the Uu interface while performing, at step 422, sidelink communication with other UEs on the PC5 interface. The traffic pattern of UE1 and other related configurations such as configured grant type 1/type 2 (including the Uu interface and the sidelink communication) are communicated in the handover process.

When UE1 moves to the cell edge, UE1 transmits, at step 423, measurement reports to the source base station S-gNB. The S-gNB decides, at step 424, to hand over UE1 to the target base station T-gNB based on the measurement report from UE1 and the radio resource conditions. The S-gNB sends, at step 425, a handover request to the source AMF (S-AMF). The handover request includes the traffic pattern information and resource configuration information of the UE1 over the Uu interface and the PC5 interface. In some embodiments, the traffic pattern includes at least one of: a set of traffic interval or periodicity, a timing offset, 5QI, priority or PPPP, reliability or PPPR, destination Layer-2 ID, maximum transport block (TB) size, uplink (UL) logical channel identity, sidelink logical channel identity, a sidelink communication type (e.g., unicast, groupcast, or broadcast), expected configured grant type (type 1 or type 2), time duration, a delay, or subcarrier spacing. In some embodiments, the resource configuration information includes at least one of the following: the configured grant type, the configured grant index, or periodicity.

In some embodiments, the S-gNB also sends information about sidelink communication to the S-AMF. The information includes at least one of the following: a sidelink communication type (e.g., unicast, groupcast, or broadcast), a sidelink bearer identity, a sidelink logical channel identity, UE-PC5-AMBR, ARP, PC5 QoS flow or a list of PC5 QoS flows, a mapping between a sidelink bearer and a QFI, the GFBR or MFBR of each sidelink QoS flow. The S-AMF selects, at step 426, a target AMF (T-AMF). The S-AMF also initiates a HO resource allocation procedure (e.g., transmitting Namf_Communication_CreateUEContext Request and/or UE context information) with the T-AMF. The T-AMF transmits, at step 427, a HO request to the T-gNB, which contains Uu and/or PC5 interface traffic pattern and sidelink communication information of UE1 as S-gNB receives from UE1. Then the T-gNB transmits, at step 428, an acknowledgement in response to the HO request. If the T-gNB accepts the handover of the UE1, the T-gNB configures the Uu communication resource and the sidelink communication resource for UE1. The Uu/sidelink communication resource configuration information includes at least one of the following: a configured grant type (type 1 and/or type 2), a configured grant index, a periodicity, a subcarrier spacing, a time domain and/or frequency domain resource location, or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

Furthermore, the T-gNB may configure the Uu and/or PC5 bearer configuration for UE1. For example, in some embodiments, the T-gNB includes information for a resource pool for autonomous resource selection, a resource pool for sidelink reception, or an exceptional resource pool for sidelink transmission. The gNB2 can also indicate a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; or a mapping between a scheduling request identity and a 5G QoS Identifier, a QoS Flow Identifier, a priority, a reliability, a delay, or a communication range level.

In some embodiments, the acknowledgement can include a Target-to-Source transparent container (including the above information) for UE1 (e.g., an HO command message generated by T-gNB and relayed via T-SMF, S-AMF and S-gNB to UE). A session update is performed between T-AMF (or T-UPF) and SMF. A session update is also performed between S-UPF and SMF.

T-AMF transmits, at step 429, a response (e.g., Namf_Communication_CreateUEContext Response) to the S-AMF. The response can include the Target-to-Source transparent container. The S-AMF transmits, at step 430, a HO response to the S-gNB. The HO response can include the Target-to-Source transparent container. The S-gNB then configures/forwards, at step 431, a handover command via RRC configuration to the UE1. After receiving the handover command, the UE1 completes the handover procedure.

Figure 5:
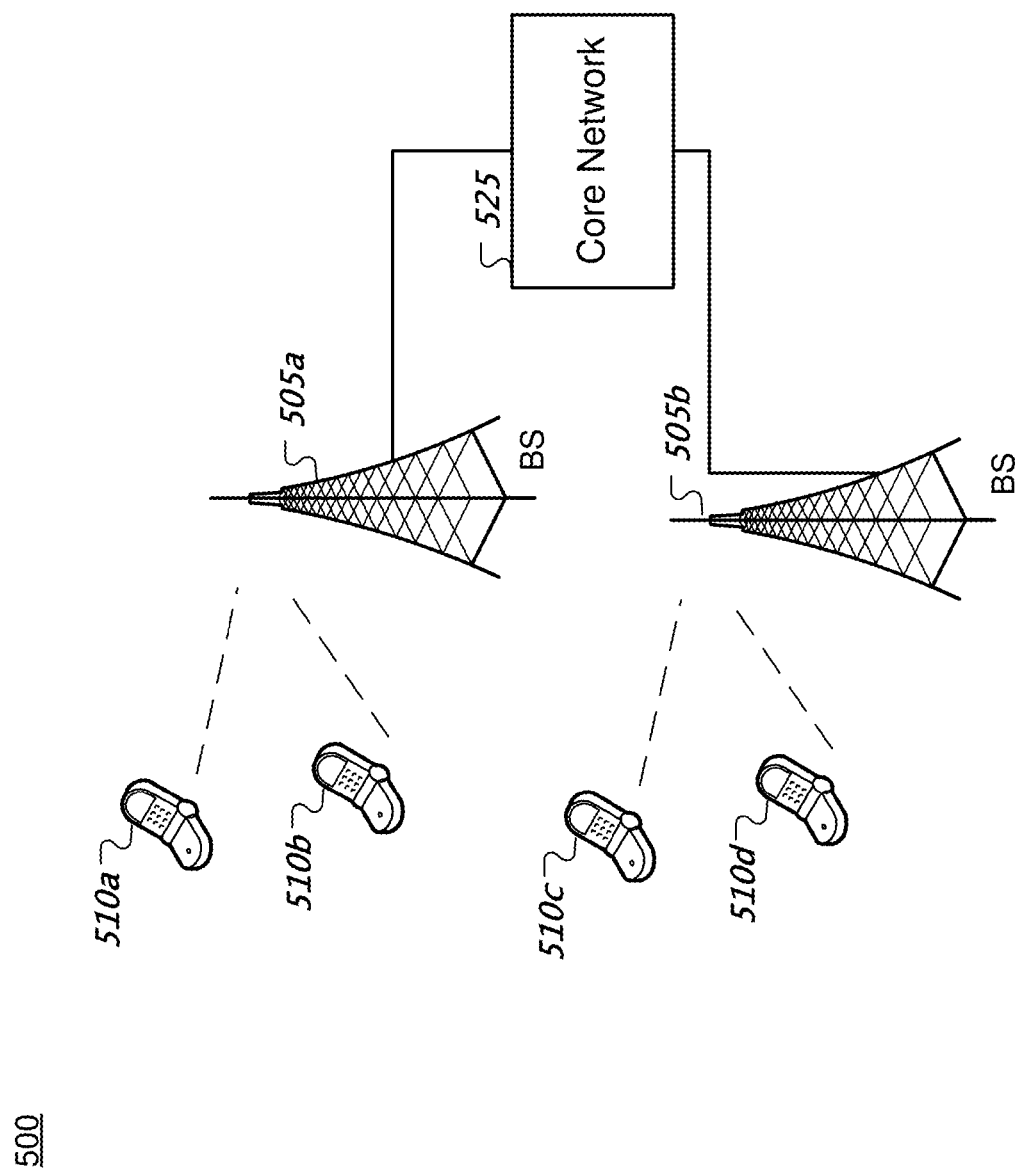
FIG. 5 shows an example of a wireless communication system where techniques in accordance with one or more embodiments of the present technology can be applied.

FIG. 5 shows an example of a wireless communication system 500 where techniques in accordance with one or more embodiments of the present technology can be applied. A wireless communication system 500 can include one or more base stations (BSs) 505a, 505b, one or more wireless devices 510a, 510b, 510c, 510d, and a core network 525. A base station 505a, 505b can provide wireless service to wireless devices 510a, 510b, 510c and 510d in one or more wireless sectors. In some implementations, a base station 505a, 505b includes directional antennas to produce two or more directional beams to provide wireless coverage in different sectors.

The core network 525 can communicate with one or more base stations 505a, 505b. The core network 525 provides connectivity with other wireless communication systems and wired communication systems. The core network may include one or more service subscription databases to store information related to the subscribed wireless devices 510a, 510b, 510c, and 510d. A first base station 505a can provide wireless service based on a first radio access technology, whereas a second base station 505b can provide wireless service based on a second radio access technology. The base stations 505a and 505b may be co-located or may be separately installed in the field according to the deployment scenario. The wireless devices 510a, 510b, 510c, and 510d can support multiple different radio access technologies.

Figure 6:
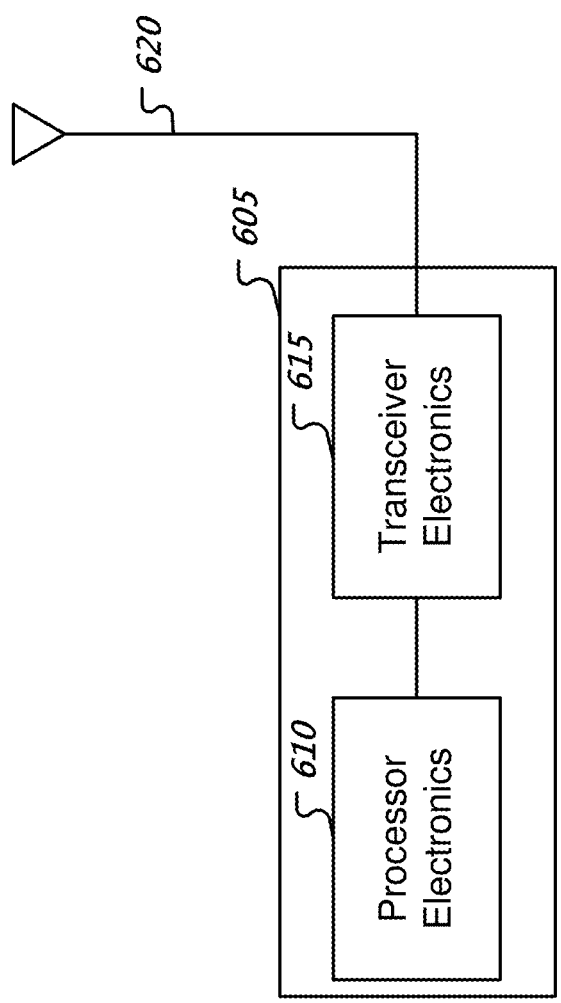
FIG. 6 is a block diagram representation of a portion of a radio station in accordance with one or more embodiments of the present technology can be applied.

FIG. 6 is a block diagram representation of a portion of a radio station. A radio station 605 such as a base station or a wireless device (or UE) can include processor electronics 610 such as a microprocessor that implements one or more of the wireless techniques presented in this document. The radio station 605 can include transceiver electronics 615 to send and/or receive wireless signals over one or more communication interfaces such as antenna 620. The radio station 605 can include other communication interfaces for transmitting and receiving data. Radio station 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the radio station 605.

It will be appreciated that the present document discloses techniques that can be embodied into wireless communication systems to provide efficient communication and mobility management for vehicles, particularly in handover scenarios, without incurring much signaling cost. The disclosed techniques can also be applied to other handover scenarios to provide information regarding the traffic pattern of a vehicle, thereby allowing more precise management of the communication links between the base stations and the vehicle or communication links between vehicles.

In one example aspect, a method for wireless communication includes transmitting, from a source communication node, a first message to a target communication node requesting a hand-over procedure for handing over one or more mobile devices from the source communication node to the target communication node. The first message indicates a traffic pattern or a group information of the one or more mobile devices. The method also includes receiving, by the source communication node, a second message from the target communication node in response to the first message.

In some embodiments, the group information is about a group of the one or more mobile devices, the group information indicating at least one of: a group handover indication, a group identifier, a group service type, a number of members in the group, an identifier for a group manager/leader, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices. In some embodiments, the second message includes at least one of: a determination to accept or deny sidelink resources for the group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

In some implementations, the method further includes determining, by the source communication node, to initiate the hand-over procedure for the group of the one or more mobile devices based on context information of a group manager in the one or more mobile devices.

In some embodiments, the first message includes the traffic pattern information of at least a first mobile device, the traffic pattern information including at least one of: a set of traffic interval or periodicity, a timing offset, a 5G QoS Indicator, a priority or a ProSe-Per-Packet Priority, a reliability or a ProSe-Per-Packet Reliability, a delay, a ProSe layer-2 destination identity, a maximum transport block (TB) size, an identifier for an uplink (UL) logical channel, an identifier for an sidelink logical channel, a sidelink communication type, an expected configured grant type, a time duration, or a subcarrier spacing. In some embodiments, the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; a mapping between a scheduling request identity and a 5G QoS Identifier, a QoS Flow Identifier, a priority, a reliability, a delay, or a communication range level; or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

In some embodiments, the first message further includes sidelink communication information for the one or more mobile devices. The sidelink communication information includes at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

In some embodiments, the second message includes a handover command generated by the target communication node for each of the one or more mobile devices. In some embodiments, the method includes transmitting, by the source communication node, the handover command to each of the one or more mobile devices to complete the hand-over procedure.

In another example aspect, a method for wireless communication includes receiving, by a target communication node, a first message from a source communication node requesting a hand-over procedure for handing over one or more mobile devices from the source communication node to the target communication node. The first message indicates a traffic pattern or a group information of the one or more mobile device. The method also includes transmitting, by the target communication node, a second message to the source communication node in response to the first message.

In some embodiments, the group information is about a group of the one or more mobile devices, the group information indicating at least one of: a group handover indication, a group identifier, a group service type, a number of members in the group, an identifier for a group manager/leader, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices. In some embodiments, the second message includes at least one of: a determination to accept or deny sidelink resources for the group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

In some embodiments, the first message includes the traffic pattern information of at least a first mobile device. The traffic pattern information includes at least one of: a set of traffic interval or periodicity, a timing offset, a 5G QoS Indicator, a priority or a ProSe-Per-Packet Priority, a reliability or a ProSe-Per-Packet Reliability, a delay, a layer-2 destination identity, a maximum transport block (TB) size, an identifier for an uplink (UL) logical channel, an identifier for an sidelink logical channel, a sidelink communication type, an expected configured grant type, a time duration, or a subcarrier spacing. In some embodiments, the second message includes at least one of: a configured grant type; a configured grant index; a periodicity; a subcarrier spacing; a time domain and/or frequency domain resource location; a resource pool for autonomous resource selection; a resource pool for sidelink reception; an exceptional resource pool for sidelink transmission; a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; a mapping between a scheduling request identity and a 5G QoS Identifier, a QoS Flow Identifier, a priority, a reliability, a delay, or a communication range level; or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

In some embodiments, the first message further includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow. In some embodiments, the second message includes a handover command generated by the target communication node for each of the one or more mobile devices.

In another example aspect, a method for wireless communication includes transmitting, from a source communication node, a first message to a source network node in a core network, the first message requesting a hand-over procedure for handing over one or more mobile devices from the source communication node to a target communication node. The first message includes a traffic pattern or a group information of the one or more mobile device. The method also includes receiving, by the source communication node, a second message from the source network node. The second message includes one or more handover commands for the one or more mobile devices. The one or more handover commands are generated by the target communication node and relayed by the source network node.

In some embodiments, the group information is about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices. In some embodiments, the second message includes at least one of: a determination to accept or deny sidelink resources for the group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

In some embodiments, the first message includes the traffic pattern information of at least a first mobile device. The traffic pattern information includes at least one of: a set of traffic interval or periodicity, a timing offset, a 5G QoS Indicator, a priority or a ProSe-Per-Packet Priority, a reliability or a ProSe-Per-Packet Reliability, a delay, a layer-2 destination identity, a maximum transport block (TB) size, an identifier for an uplink (UL) logical channel, an identifier for an sidelink logical channel, a sidelink communication type, an expected configured grant type, a time duration, or a subcarrier spacing. In some embodiments, the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; a mapping between a scheduling request identity and a 5G QoS Identifier, a QoS Flow Identifier, a priority, a reliability, a delay, or a communication range level; or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

In some embodiments, the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

In another example aspect, a method for wireless communication includes receiving, by a target communication node, a first message from a target network node in a core network, wherein the first message includes information about a handover request requesting a hand-over procedure for handing over one or more mobile devices from a source communication node to the target communication node. The handover request includes a traffic pattern or group information of the one or more mobile devices. The method also includes transmitting, by the target communication node, a second message to the target network node in response to the first message. The second message includes one or more handover commands for the one or more mobile devices, wherein the one or more handover commands are generated by the target communication node and relayed by the target network node.

In some embodiments, the group information is about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices. In some embodiments, the second message includes at least one of: a determination to accept or deny sidelink resources for the group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

In some embodiments, the first message includes the traffic pattern information of at least a first mobile device, the traffic pattern information including at least one of: a set of traffic interval or periodicity, a timing offset, a 5G QoS Indicator, a priority or a ProSe-Per-Packet Priority, a reliability or a ProSe-Per-Packet Reliability, a delay, a layer-2 destination identity, a maximum transport block (TB) size, an identifier for an uplink (UL) logical channel, an identifier for an sidelink logical channel, a sidelink communication type, an expected configured grant type, a time duration, or a subcarrier spacing. In some embodiments, the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a 5G QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; a mapping between a scheduling request identity and a 5G QoS Identifier, a QoS Flow Identifier, a priority, a reliability, a delay, or a communication range level; or an attribute for each configured grant. The attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

In some embodiments, the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
transmitting, from a source communication node, a first message to a target communication node requesting a hand-over procedure for handing over one or more mobile devices from the source communication node to the target communication node, the first message indicating a traffic pattern information of the one or more mobile devices, wherein the traffic pattern information includes a set of traffic interval or periodicity, the traffic pattern information further including at least one of a timing offset, a Quality of Service (QoS) Indicator, a priority, a reliability, a delay, a layer-2 destination identity, a maximum transport block (TB) size, an identifier for an uplink (UL) logical channel, an identifier for a sidelink logical channel, a sidelink communication type, an expected configured grant type, a time duration, or a subcarrier spacing; and
receiving, by the source communication node, a second message from the target communication node in response to the first message, wherein the second message includes at least one of: a determination to accept or deny sidelink resources for a group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

2. The method of claim 1, wherein the first message further includes group information about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices.

3. The method of claim 1, comprising:
determining, by the source communication node, to initiate the hand-over procedure for the group of the one or more mobile devices based on context information of a group manager in the one or more mobile devices.

4. The method of claim 1, wherein the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a QoS Identifier, a QoS Flow Identifier, a priority, a reliability, a delay, or a communication range level; a mapping between a sidelink logical channel group identity and a scheduling request identity, a QoS Identifier, a QoS Flow Identifier, a priority, a reliability, a delay, or a communication range level; a mapping between a scheduling request identity and a QoS Identifier, a QoS Flow Identifier, a priority, a reliability, a delay, or a communication range level; or an attribute for each configured grant, wherein the attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

5. The method of claim 1, wherein the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

6. A method for wireless communication, comprising:
receiving, by a target communication node, a first message from a source communication node requesting a hand-over procedure for handing over one or more mobile devices from the source communication node to the target communication node, the first message indicating a traffic pattern information of the one or more mobile devices, wherein the traffic pattern information includes a set of traffic interval or periodicity, the traffic pattern information further including at least one of a timing offset, a Quality of Service (QoS) Indicator, a priority, a reliability, a delay, a layer-2 destination identity, a maximum transport block (TB) size, an identifier for an uplink (UL) logical channel, an identifier for a sidelink logical channel, a sidelink communication type, an expected configured grant type, a time duration, or a subcarrier spacing; and
transmitting, by the target communication node, a second message to the source communication node in response to the first message, wherein the second message includes at least one of: a determination to accept or deny sidelink resources for a group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

7. The method of claim 6, wherein the first message further includes group information is about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices.

8. The method of claim 6, wherein the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a QoS Identifier, a QoS Flow Identifier, a priority, a reliability, a delay, or a communication range level; a mapping between a sidelink logical channel group identity and a scheduling request identity, a QoS Identifier, a QoS Flow Identifier, a priority, a reliability, a delay, or a communication range level; a mapping between a scheduling request identity and a QoS Identifier, a QoS Flow Identifier, a priority, a reliability, a delay, or a communication range level; or an attribute for each configured grant, wherein the attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

9. The method of claim 6, wherein the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

10. The method of claim 6, wherein the second message includes a handover command generated by the target communication node for each of the one or more mobile devices.

11. A wireless communication apparatus, comprising a processor configured to:
transmit a first message to a target communication node requesting a hand-over procedure for handing over one or more mobile devices from the apparatus to the target communication node, the first message indicating a traffic pattern information of the one or more mobile devices, wherein the traffic pattern information includes a set of traffic interval or periodicity, the traffic pattern information further including at least one of a timing offset, a Quality of Service (QoS) Indicator, a priority, a reliability, a delay, a layer-2 destination identity, a maximum transport block (TB) size, an identifier for an uplink (UL) logical channel, an identifier for a sidelink logical channel, a sidelink communication type, an expected configured grant type, a time duration, or a subcarrier spacing; and
receive a second message from the target communication node in response to the first message, wherein the second message includes at least one of: a determination to accept or deny sidelink resources for a group, a list of accepted group members, a bandwidth part or a beam direction for sidelink communication in the group, a resource or a resource pool allocated for each of the one or more mobile devices, an identifier for each of the one or more mobile devices allocated by the target communication node, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

12. The apparatus of claim 11, wherein the first message further includes group information about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices.

13. The apparatus of claim 11, wherein the processor is configured to initiate the hand-over procedure for the group of the one or more mobile devices based on context information of a group manager in the one or more mobile devices.

14. The apparatus of claim 11, wherein the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a QoS Identifier, a QoS Flow Identifier, a priority, a reliability, a delay, or a communication range level; a mapping between a sidelink logical channel group identity and a scheduling request identity, a 5G QoS Identifier, a QoS Flow Identifier, a priority, a reliability, a delay, or a communication range level; a mapping between a scheduling request identity and a QoS Identifier, a QoS Flow Identifier, a priority, a reliability, a delay, or a communication range level; or an attribute for each configured grant, wherein the attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

15. The apparatus of claim 11, wherein the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

16. A wireless communication apparatus, comprising a processor configured to:
receive a first message from a source communication node requesting a hand-over procedure for handing over one or more mobile devices from the source communication node to the apparatus, the first message indicating a traffic pattern information of the one or more mobile devices, wherein the traffic pattern information includes a set of traffic interval or periodicity, the traffic pattern information further including at least one of a timing offset, a Quality of Service (QoS) Indicator, a priority, a reliability, a delay, a layer-2 destination identity, a maximum transport block (TB) size, an identifier for an uplink (UL) logical channel, an identifier for a sidelink logical channel, a sidelink communication type, an expected configured grant type, a time duration, or a subcarrier spacing; and
transmit a second message to the source communication node in response to the first message, wherein the second message includes at least one of: a determination to accept or deny sidelink resources for a group, a list of accepted group members, a bandwidth part or a beam direction for sidelink communication in the group, a resource or a resource pool allocated for each of the one or more mobile devices, an identifier for each of the one or more mobile devices allocated by the apparatus, a list of accepted or defined Protocol Data Unit (PDU) sessions for each of the one or more mobile devices, an accepted sidelink radio bearer or QoS flow list for each of the one or more mobile devices, or a denied sidelink radio bearer or QoS flow list for each of the one or more mobile devices, the denied side radio bearer or QoS flow list further including a cause of denial.

17. The apparatus of claim 16, wherein the first message further includes group information is about a group of the one or more mobile devices, the group information indicating at least one of: a group handover indication, a group identifier, a group service type, a number of members in the group, an identifier for a group manager, an identifier for each of the one or more mobile devices, movement information of the group, one or more supported radio access technology for sidelink communication in the group, a quality of service (QoS) requirement for the sidelink communication in the group, or a list of Protocol Data Unit (PDU) sessions for each of the one or more mobile devices.

18. The apparatus of claim 16, wherein the second message includes at least one of: a configured grant type; a configured grant index; a periodicity; a subcarrier spacing; a time domain resource location; a frequency domain resource location; a resource pool for autonomous resource selection; a resource pool for sidelink reception; an exceptional resource pool for sidelink transmission; a mapping between a sidelink logical channel and a configured grant index, a scheduling request identity, a QoS Identifier, a QoS Flow Identifier, a priority, a reliability, a delay, or a communication range level; a mapping between a sidelink logical channel group identity and a scheduling request identity, a QoS Identifier, a QoS Flow Identifier, a priority, a reliability, a delay, or a communication range level; a mapping between a scheduling request identity and a QoS Identifier, a QoS Flow Identifier, a priority, a reliability, a delay, or a communication range level; or an attribute for each configured grant, wherein the attribute includes at least one of a 5QI, a priority or ProSe-Per-Packet Priority (PPPP), a reliability or ProSe-Per-Packet Reliability (PPPR), a delay, a Logical Channel Identity (LCID), or a Logical Channel Group Identity (LCGID).

19. The apparatus of claim 16, wherein the first message includes sidelink communication information for the one or more mobile devices, the sidelink communication information including at least one of: a sidelink communication type, a sidelink bearer identity, a sidelink logical channel identity, a sidelink Aggregate Maximum Bit Rate (AMBR), an Allocation and Retention Priority (ARP), one or more sidelink QoS flows, a mapping between a sidelink bearer and a QoS Flow Identity (QFI), or a Guaranteed Flow Bit Rate (GFBR) or a Maximum Flow Bit Rate (MFBR) of each sidelink QoS flow.

20. The apparatus of claim 16, wherein the second message includes a handover command generated by the apparatus for each of the one or more mobile devices.

\* \* \* \* \*